Patented Mar. 2, 1954

2,670,528

UNITED STATES PATENT OFFICE 2,670,528

PROCESS OF THERMAL REGULATION OF WORK AND TOOLS

Paul E. Brunberg, Detroit, Mich.

No Drawing. Application June 9, 1951,
Serial No. 230,849

3 Claims. (Cl. 29—148)

This invention relates to a process of thermal regulation of work and tools in machining operations of cutting, milling, shaping, broaching, forming and the like.

The object of the invention is the provision of a method or process in which original metallurgical properties can be maintained such as those contained in austenitic steels during machining and forming operations.

Austenitic steels, which include stainless steel, Hastelloy, Multimet, chrome-nickel, manganese (Hadfield's) steel and many others tend to work harden and change structure during machining and forming. These steels become magnetic on the surface, alter the grain structure, segregate, and lose the desirable properties such as corrosion resistance in a large degree for which the same were intended. Machining of the same seldom exceeded 18% of the speed expected for ordinary steel. Tool mortality was exceptionally high. Some of the grades such as manganese (Hadfield's) were finished by grinding in every step of the operation.

The new metal titanium and its alloys are practically non-machinable under normal conditions and methods since "galling," work hardening and low temperature oxidation produce incendiary results.

Commercial coolants of every variety have failed to cope with the basic causes of failure to machine steel properly or to maintain a climate for accuracy in any machining operation ferrous or non-ferrous.

A critical examination of circumstances surrounding metal cutting and forming will show that contact temperatures between work and tool may reach as high as 1,600° F. during the instant of cutting. This has been measured by thermocouple at the junction stated. This temperature creeps throughout the entire section as work goes on to expand the mass in relation to its coefficient. Thus, as dimensional accuracy is lost by cubical expansion another factor enters the operation in that the expanded mass increases pressure against the tool, causing a burnishing effect while adding to the heat contained in the piece by friction. Obviously, tools become dull and heat destroys their properties. Cemented carbides "crater" under the grueling action of heat and pressure. The chemistry of the piece being machined will assume the properties of its characteristics at the temperature of contact with the tool, whatever that may be, and the error of the old art has been to quench whatever segregated structure happened to be present.

This invention demonstrates a new metallurgical result. It effectively comes to grips with the thermal phase of machine operations, permitting the same to be carried on without physical or chemical change in the work.

I have discovered that a continuous, measured supply of liquid carbon dioxide of high purity, when directed to the immediate area where tool contacts work, will deposit by expansion a measured quantity of solid carbon dioxide in which a temperature in the region of 112° F. is attained. The presence of the solid carbon dioxide attracts the heat rays to itself as the same are generated, causing the solid carbon dioxide to sublime to the gaseous state. The measurement of liquid carbon dioxide through accurate jets of small dimension permit a balance in B. t. u.'s to be transferred in the operation, resulting in room temperature at both work and tool. The phenomena can be described as a cold catalyst in action.

Measurement of liquid carbon dioxide is critical, as is purity (lack of water vapor) and other matter out of place. When the liquid exits from the jet and expands on the tool and work as solid carbon dioxide, a film of gas immediately appears in an infinitesimal layer between the metal and solid carbon dioxide. Hence, no freezing of the metal or tool occurs when properly measured. The work of machining goes on to completion throughout its cycle at room temperature.

From an appropriate source of pure liquid carbon dioxide normally held at approximately 850 pounds per square inch pressure, I direct the same to a solenoid valve from whence it is distributed through tubing to a jet of proper size, the latter being built into a fixture when necessary to direct the flow to work-tool terminus. A valuable secondary effect of the process is the disposal of dry, clean chips under the available pressure.

This invention has been the means for increasing machining speed of critical military alloys such as Inconel, Multimet, chrome-nickel, titanium, and many others up to standards normally associated with normal commercial metals. In the process of machining these metals physical properties and chemistry of surface has been faithfully maintained as per original. Another result of this invention is the new art of machining post heat treated alloy steels, carbon steels and other metals measured up to 55 Rockwell C. at speeds comparable to annealed sections and accurate to within $3/10,000$ inch without grinding. Surfaces have been measured for finish resulting in readings of 15 micro-inches.

The salient point of this invention is the "arrest factor" which makes the process function properly without consideration for ever changing atmospheric conditions. If, for example, room temperature and metal temperature register 70° F., work will proceed at that temperature. If room and metal registered 60° F. or 80° F. the work would proceed and end at the same. Thus, the "arrest factor" deals with the localized production of thermal units and functions at that point irrespective of temperature in the mass.

In contrast, if a metal section were frozen to a temperature of 100 minus, zero or any arbitrary number, and machined as is, the result would be the same and, perhaps, worse than any method of the old art because temperature in the mass cannot cope with the localized intense heat as found at contact of work-tool. Accordingly, this invention is a means of thermal regulation of work and tools.

This invention is based upon the principle which suggests an atomic model in which the electron travels in a circular orbit about the proton. In each of these orbits the energy of motion, or kinetic energy, of the electron is just balanced by the force of attraction that is exerted by the nucleus and prevents the electron from escaping. If an electron traveling in some particular orbit is to be made to travel in an orbit more distant from the nucleus, it must be supplied with energy from some outside source, because work must be done to pull the electron away from the nucleus that attracts it. Accordingly, the emphasis of the process concerns the metallurgical and dimensional results with a cold catalyst as means of bringing the same about.

The driving force which causes the transfer of heat from one substance to another is the temperature difference which exists between the same. The ultimate destination of the heat is controlled by the thermal conductivity of the substance upon which it impinges. Thus, in the case of carbon dioxide which has poor thermal conductance properties, heat will be absorbed by it and not transfer to another body.

A typical machine operation such as drilling or lathe work introduces two principal components of behavior. The first concerns internal friction with sharp rise in temperature at the contact point of work and tool. As previously stated, this may be as high as 1,600° F. and alter the structure of the metal considerably while destroying the tool.

The second component is a result of the first in that a cumulative storage of thermal units occurs to affect the cubical expansion of the segment. In the old art the latter effect caused additional operations in attempts to secure dimensional accuracy. This invention, in providing the "arrest factor," positively intercepts each heat unit in the process of its creation, which permits working to be carried on without dimensional change or alteration of the original grain structure.

A typical machining operation in which this invention is employed is carried on as follows:

The material is a flange for joining collector rings on an internal combustion engine for aircraft. The material is an alloy steel having in addition to iron approximately 19% chrome and 9% nickel. The alloy, in the rough state, is considered to be a light section and is of cast origin. The section, as cast, requires removal of about one eighth inch of stock from the inside of the same.

The job is set up on a face plate of a lathe. A jet of .009 inch diameter is set on the tool rest with an appropriate fixture to direct the stream of liquid at the junction of tool and work with slight overlapping in the direction of the steel. A trial cut is made at customary cutting speed to determine volume of liquid carbon dioxide required. If a balance of temperature has been reached, indicating room temperature result at both work and tool, the spindle speed will be increased in resetting the machine and the jet diameter will be changed to .012 inch diameter.

Another cut is taken for ultimate temperature and to gage the piece. If measurement and tolerance is satisfactory, the machine will be reset again to increase spindle speed further and accelerate the feed.

A jet of .015 inch will be inserted in the tool fixture and the run of production begun. Measurement of the piece for roundness and size together with finish temperature of the segment will indicate whether an adjustment of feed is necessary to secure the same contained temperature in the steel at the end of the operation as when the same was begun. A qualitative indication of this is visual since the phenomena of sublimation is so rapid that the work appears to be going on dry, or, without addition of any agent at all.

The setting of work for milling machines, gear hobs, gear shapers and boring mills is identical as described above. The important point in applying this invention is to make positive contact at the junction where tool contacts work. Both must be in range of the end of the jet which is a normal distance of approximately 1½ inches.

The varied specific heats of the metals indicates the impractical suggestion that a job shall be set up by mathematical calculations for jet size and speed of cutting. The problem would be further complicated by the amount of metal required to be removed. The method of application as described is quick and simple and within the scope of casual machine operators for setting their own jobs.

Another application of this invention concerns movable tools such as drills. Here the problem is one concerning depth of hole and kind of metal or alloy. If the hole is but four inches in depth, a jet directed downward into the hole will suffice to absorb the temperature and dispose of the chips. Where gun type drills are used for deep holes of more than 12 inches, the jet is built into the drill itself to allow emission of liquid carbon dioxide in a constant stream at the base of the tool where the same contacts work.

Production records show that holes of a depth of 48 inches have been drilled in this manner with a total displacement over the entire distance of only .004 inch with not over two degrees variance in temperature contained in the steel.

Tapping follows the same rule as drilling. If the depth of thread is 2 inches and the diameter of tap ¾ inch, one jet, directed downward, will suffice. If the tap is larger, two jets, located opposite, both directed downward, will apply.

Because of varying conditions, the operator will remember the basic rule that liquid carbon dioxide shall expand at the point where tool contacts work.

What I claim is:

1. A method of cutting a metal work piece of titanium and its alloys, which comprises contacting the titanium metal with a cutting tool, creating relative movement between the metal and tool to cause cutting, subjecting the point of contact of the work piece and tool to a stream of carbon dioxide released from a liquid stream in the immediate vicinity of the point of contact to deposit a transitory coating of solid carbon dioxide on the work piece and the tool at the point of contact, the carbon dioxide being deposited at a rate such that the sublimation of said coating prevents any material temperature change in the work piece.

2. A method of cutting a metal work piece of steel which comprises contacting the steel with a cutting tool, creating relative movement between the steel and the tool to cause cutting, subjecting the point of contact of the work piece and tool to a stream of carbon dioxide released from a liquid stream in the immediate vicinity of the point of contact to deposit a transitory coating of solid carbon dioxide on the work piece and the tool at the point of contact, the carbon dioxide being deposited at a rate such that the sublimation of said coating prevents any material temperature change in the work piece.

3. A method of cutting a metal work piece of austenitic alloys which comprises contacting the work piece of the alloy with a cutting tool, creating relative movement between the metal austenitic alloy and the tool to cause cutting, subjecting the point of contact of the work piece and tool to a stream of carbon dioxide released from a liquid stream in the immediate vicinity of the point of contact to deposit a transitory coating of solid carbon dioxide on the work piece and the tool at the point of contact, the carbon dioxide being deposited at a rate such that the sublimation of said coating prevents any material temperature change in the work piece.

PAUL E. BRUNBERG.

References Cited in the file of this patent

UNITED STATES PATENTS

| Number | Name | Date |
|---|---|---|
| 1,029,395 | Muller | June 11, 1912 |
| 1,214,009 | Coleman | Jan. 30, 1917 |
| 1,427,100 | Gilbert | Aug. 29, 1922 |
| 1,644,338 | Jones | Oct. 4, 1927 |
| 2,067,676 | Lees | Jan. 12, 1937 |
| 2,165,056 | Kalischer | July 4, 1939 |
| 2,182,952 | Todd et al. | Dec. 12, 1939 |
| 2,482,097 | Clarke | Sept. 20, 1949 |